US009614798B2

(12) United States Patent
Ehms et al.

(10) Patent No.: US 9,614,798 B2
(45) Date of Patent: Apr. 4, 2017

(54) METHOD AND AN APPARATUS FOR DISTRIBUTION OF A MESSAGE

(75) Inventors: Karsten Ehms, München (DE); Michael Heiss, Vienna (AT); Manfred Langen, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 76 days.

(21) Appl. No.: 13/225,807

(22) Filed: Sep. 6, 2011

(65) Prior Publication Data

US 2013/0060864 A1   Mar. 7, 2013

(51) Int. Cl.
*H04L 12/58*   (2006.01)
*G06F 17/30*   (2006.01)

(52) U.S. Cl.
CPC .............. *H04L 51/14* (2013.01); *H04L 51/32* (2013.01); *G06F 17/3066* (2013.01); *G06F 17/3089* (2013.01)

(58) Field of Classification Search
CPC ........... G06Q 30/0201; G06Q 30/0631; G06Q 30/02; G06Q 30/0269; G06Q 50/01; G06F 3/0237; H04W 4/206
USPC .......................... 709/203, 206, 207, 223, 224
See application file for complete search history.

(56) References Cited

U.S. PATENT DOCUMENTS

| | | | |
|---|---|---|---|
| 5,974,412 A * | 10/1999 | Hazlehurst | G06F 17/3066 |
| 2007/0050455 A1 * | 3/2007 | Yach et al. | 709/206 |
| 2007/0106780 A1 * | 5/2007 | Farnham et al. | 709/223 |
| 2009/0049140 A1 * | 2/2009 | Stoddard et al. | 709/206 |
| 2009/0112701 A1 * | 4/2009 | Turpin | G06Q 30/02 705/7.33 |
| 2009/0144418 A1 * | 6/2009 | Alstyne et al. | 709/224 |
| 2009/0204676 A1 * | 8/2009 | Parkinson et al. | 709/206 |
| 2009/0319288 A1 * | 12/2009 | Slaney | G06Q 30/02 705/1.1 |
| 2009/0319436 A1 * | 12/2009 | Andra et al. | 705/80 |
| 2009/0327484 A1 * | 12/2009 | Chen et al. | 709/224 |
| 2010/0293035 A1 * | 11/2010 | Athsani et al. | 705/10 |
| 2010/0312649 A1 * | 12/2010 | Lurie | 705/14.66 |
| 2010/0312843 A1 * | 12/2010 | Robinson | 709/206 |
| 2011/0078265 A1 * | 3/2011 | Yach et al. | 709/206 |
| 2011/0137894 A1 * | 6/2011 | Narayanan | G06F 17/3089 707/723 |

(Continued)

*Primary Examiner* — Barbara Burgess
(74) *Attorney, Agent, or Firm* — Slayden Grubert Beard PLLC

(57) ABSTRACT

A message distribution apparatus and method for distribution of a message submitted by a user by a terminal connected to a communication network to a previously unknown group of receiving users has an access to a database which stores a semantic network data model with terms linked to each other by semantic relations and/or a social network data model with users linked to each other by social relations; a mapping engine which maps at least one term being associated with the submitted message to terms being associated with users of the social network data model and/or with terms of the semantic data model for generating a group of potential receiving users for the submitted message; and a distribution engine which distributes the submitted message of the submitting user via the communication network to a group of receiving users filtered from the at least one generated group of potential receiving users.

20 Claims, 3 Drawing Sheets

(56) References Cited

U.S. PATENT DOCUMENTS

| | | | |
|---|---|---|---|
| 2011/0191693 A1* | 8/2011 | Baggett et al. | 715/752 |
| 2011/0208822 A1* | 8/2011 | Rathod | 709/206 |
| 2011/0270937 A1* | 11/2011 | Portilla | 709/206 |
| 2012/0102130 A1* | 4/2012 | Guyot | H04L 51/12 709/206 |
| 2012/0222132 A1* | 8/2012 | Burger et al. | 726/28 |
| 2012/0224743 A1* | 9/2012 | Rodriguez | G06T 11/60 382/103 |
| 2012/0246174 A1* | 9/2012 | Spears et al. | 707/749 |

* cited by examiner

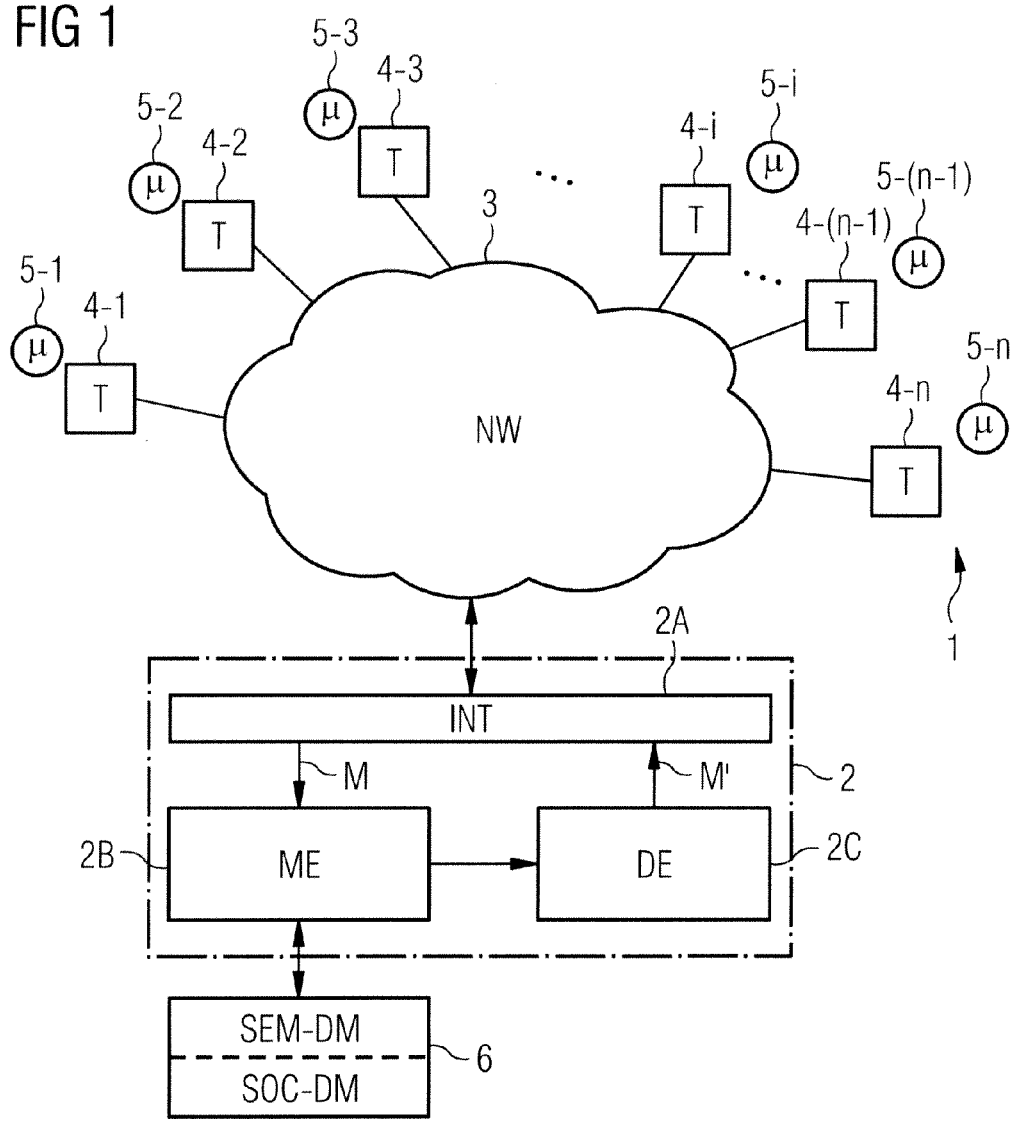
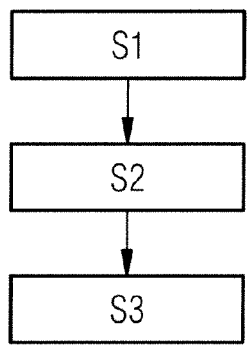

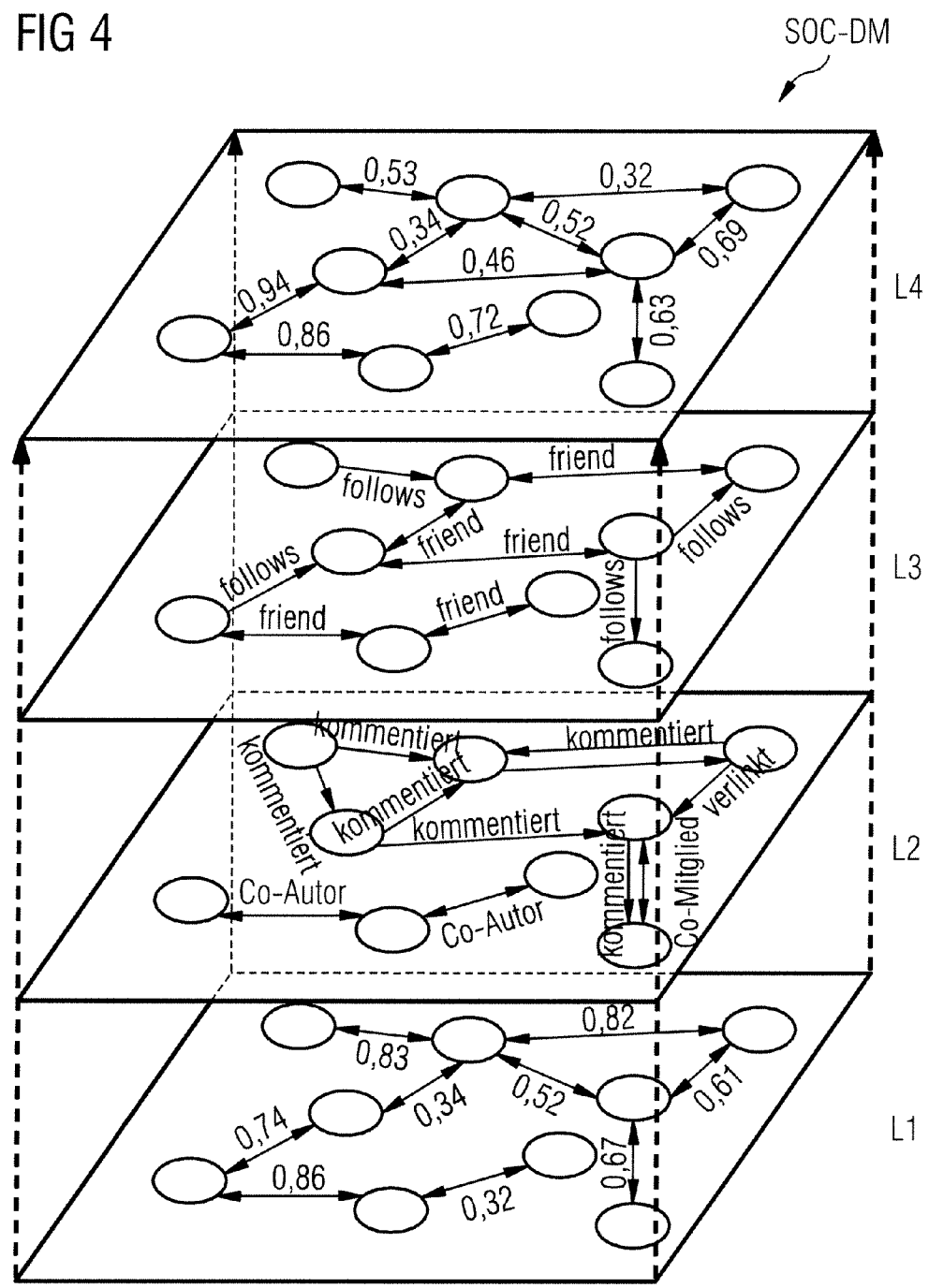

METHOD AND AN APPARATUS FOR DISTRIBUTION OF A MESSAGE

TECHNICAL FIELD

The invention relates to a method and to an apparatus for distribution of a message submitted by a user by means of a terminal connected to a communication network to a previously unknown group of receiving users.

BACKGROUND

In conventional message distribution systems a message such as a newsletter is sent to a predetermined group of receivers whose addresses are stored. This static approach has several disadvantages. The message is only received by those users whose addresses are listed in a data storage or database of the distributing user. Accordingly, many potential users which might be interested in receiving that message will not get the message from the distributing user. A further drawback is that many users whose addresses are listed in the database of the distributing user will receive the message, however, they might not be interested in the content of the message and will drop the received message. These receiving users might be even annoyed to receive such a message from the distributing user so that a potential relationship between the distributing user and the receiving user might deteriorate. For example, the user which gets often a newsletter from the distributing user with a content which is not interesting for him might ask the distributing user to send no more newsletters in the future. A further drawback of the conventional system using a static approach for distributing messages is that it takes a lot of work and care to update the database of addresses of receiving users, in particular since users might change their address over time, for example when leaving a company and working for another company.

SUMMARY

According to various embodiments, a method and an apparatus for the distribution of messages may avoid the above-mentioned drawbacks and make it possible to send messages to interested users in an efficient way.

According to an embodiment, a message distribution apparatus for distribution of a message submitted by a user by means of a terminal connected to a communication network to a previously unknown group of receiving users; may comprise: (a) an access to a database which stores a semantic network data model comprising terms linked to each other by semantic relations and/or a social network data model comprising users linked to each other by social relations; (b) a mapping engine which is adapted to map at least one term being associated with the submitted message to terms being associated with users of said social network data model and/or with terms of said semantic data model for generating at least one group of potential receiving users for said submitted message; and (c) a distribution engine which is adapted to distribute the submitted message of said submitting user via said communication network to a group of receiving users filtered from the at least one generated group of potential receiving users.

According to a further embodiment, said submitted message may comprise as the at least one term associated with said submitted message a tag assigned by said submitting user to said submitted message or a tag derived from said submitted message. According to a further embodiment, said mapping engine may be adapted to expand the at least one term associated with said submitted message to related associated terms on the basis of weighted semantic relation links of said semantic network data model. According to a further embodiment, the distribution engine can be adapted to distribute the submitted message to another user by pushing said submitted message to the terminal of the other user or to a personalized webpage of the other user. According to a further embodiment, the mapping engine can be adapted to calculate a sorted list of associated related terms being associated with the at least one term of the submitted message on the basis of weighted semantic relation links of said semantic network data model to identify users having a relation to the related associated terms. According to a further embodiment, said mapping engine can be adapted to expand the identified users having a relation to the related associated terms by users having a close social relationship with the identified users on the basis of the weighted social relation links of said social network data model. According to a further embodiment, said mapping engine can be adapted to derive a group of potential receiving users for the submitted message from the expanded group of identified users. According to a further embodiment, the distribution engine may comprise a distribution filter adapted to filter the group of potential receiving users output by said mapping engine depending on a priority indicator of the submitted message, wherein said priority indicator indicates a level of importance of the submitted message or depending on a predetermined maximum number of receiving users, and/or depending on the personal settings of the potential receiving users. According to a further embodiment, said priority indicator can be assigned by the submitting user to the submitted message or calculated on the basis of importance criteria comprising a business impact, an urgency and a topic novelty of the submitted message. According to a further embodiment, said communication network may comprise a wired or wireless data network including a local area network, a wide area network or the internet or a telephone network. According to a further embodiment, said terminal can be a telephone, a mobile terminal or a not mobile terminal comprising a computer, a laptop, a PDA, a mobile station or a mobile phone of a user. According to a further embodiment, said submitted message can be an electronic message comprising an e-mail, an SMS, a RSS-feed, a voice message or a data packet. According to a further embodiment, said semantic network data model may comprise at least one semantic network data model layer including: an imported semantic network layer, an edited semantic network layer, a semantic network layer of co-occurrence relations and an aggregated semantic data model layer aggregated on the basis of other semantic network layers. According to a further embodiment, said social network data model may comprise at least one social network data model layer including: a social network layer of explicit relations between users, a social network layer derived from interactions between users, a social network layer of potential relations between users and an aggregated social network layer aggregated on the basis of other social network layers.

According to another embodiment, a method for distributing a message submitted by a user by means of a terminal connected to a communication network to a previously unknown group of receiving users may comprise the steps of: (a) providing a semantic network data model comprising terms linked to each other by semantic relations and/or a social network data model comprising users linked to each other by social relations; (b) mapping at least one term associated with the submitted message to terms being associated with users of said social network data model and/or terms of said semantic network data model to generate at least one group of potential receiving users for said submitted message; and (c) distributing the submitted message via said communication network to a group of receiving users filtered from the at least one group of potential receiving users.

According to yet another embodiment, a message distribution software tool may comprise a program having a program code for executing the method as described above.

According to yet another embodiment, a data carrier may store the message distribution software tool as described above.

According to yet another embodiment, a communication network may comprise at least one message distribution apparatus as described above and a plurality of user terminals.

According to yet another embodiment, a server of a communication network may comprise an execution unit for executing an application using said message distribution software tool as described above, said application comprising a browser, a social networking application, an expert application or an information distribution application.

BRIEF DESCRIPTION OF THE DRAWINGS

In the following possible embodiments and implementations of a message distribution apparatus for distribution of a message and a method for distributing a message submitted by a user by means of a terminal connected to a communication network to a previously unknown group of receiving users are described with reference to the enclosed figures.

FIG. 1 shows a block diagram for illustrating a system comprising a message distribution apparatus according to a possible embodiment;

FIG. 2 shows a flow chart of a possible implementation of a method for distributing a message;

FIG. 4 shows a diagram for illustrating a possible implementation of a social network data model comprising several layers.

DETAILED DESCRIPTION

Figure 3:
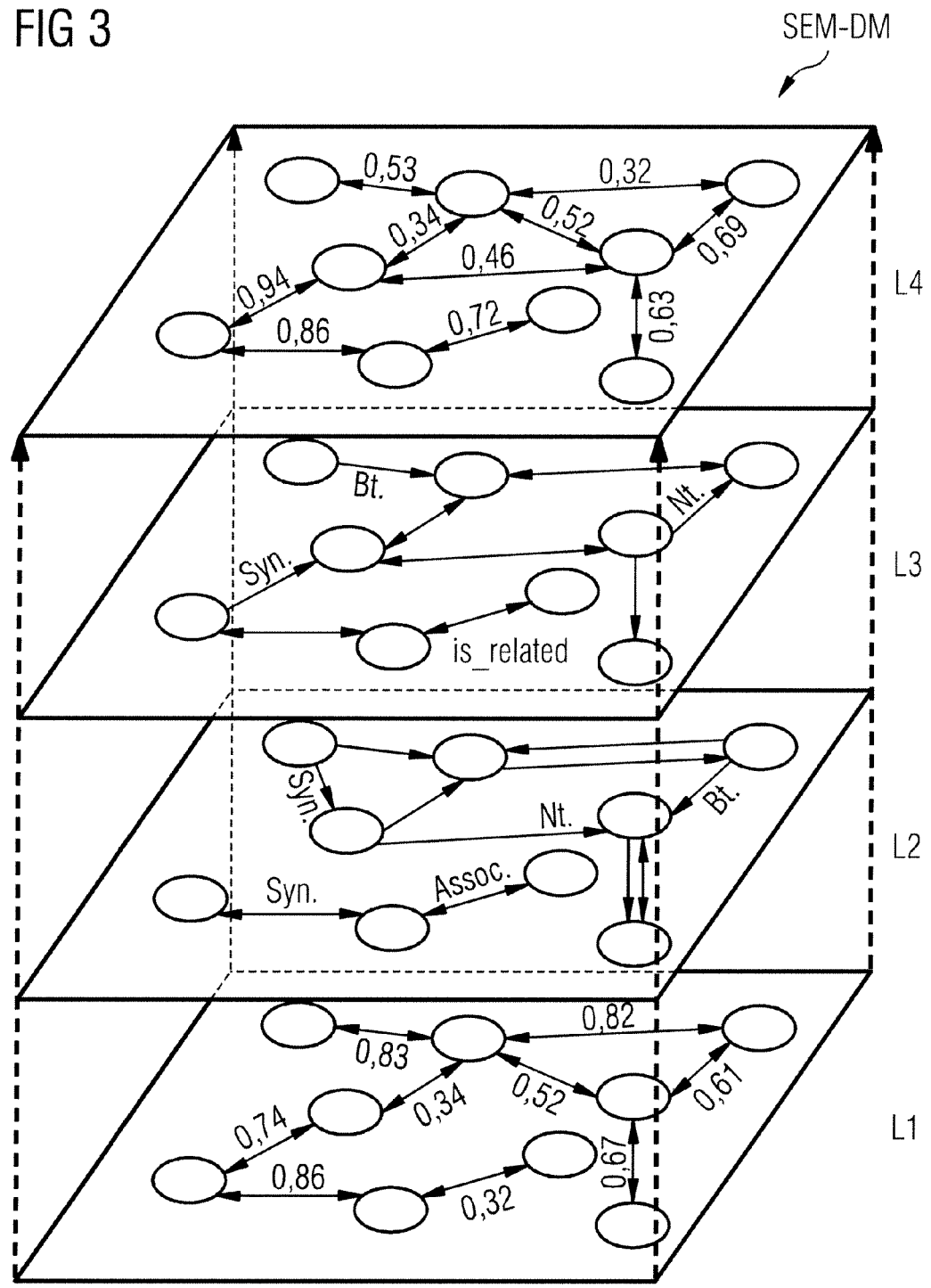
FIG. 3 shows a diagram for illustrating a possible implementation of a semantic network data model having several layers.

According to various embodiments, a message distribution apparatus for distribution of a message submitted by a user by means of a terminal connected to a communication network to a previously unknown group of receiving users, may comprise: an access to a database which stores a semantic network data model comprising terms linked to each other by semantic relations and/or a social network data model comprising users linked to each other by social relations;
a mapping engine which is adapted to map at least one term being associated with the submitted message to terms being associated with users of said social network data model and/or with terms of said semantic data model for generating at least one group of potential receiving users for the submitted message; and
a distribution engine which is adapted to distribute the submitted message of said submitting user via said communication network to a group of receiving users filtered from the at least one generated group of potential receiving users.

With the message distribution apparatus according to various embodiments, a group of receiving users is changed dynamically depending on semantic content of the message and depending on social relationships between the users.

In a possible embodiment of the message distribution apparatus, the submitted message comprises a tag as the least one term associated with the submitted message wherein a tag is the assigned by said submitting user to said submitted message.

In a further possible embodiment the submitted message comprises as the at least one term associated with the submitted message a tag being derived automatically from said submitted message.

In a still further embodiment of the message distribution apparatus, a mapping engine is adapted to expand the at least one term associated with the submitted message to related terms on the basis of weighted semantic relation links of said semantic network data model.

In a possible embodiment of the message distribution apparatus, the distribution engine is adapted to distribute the submitted message to another user by pushing said message to the terminal of the other user.

In an alternative embodiment the message distribution apparatus, comprises a distribution engine which is adapted to distribute the submitted message to another user by pushing the submitted message to a personalized webpage of the other user.

In a possible embodiment of the message distribution apparatus, a mapping engine is adapted to calculate a sorted list of associated related terms being associated with the at least term of the submitted message on the basis of weighted semantic relation links of said semantic network data model to identify users having a relation to the related associated terms.

In a still further possible embodiment of the message distribution apparatus, the mapping engine is adapted to expand the identified users having a relation to the related associated terms by users having a close social relationship with the identified users on the basis of the weighted social relation links of said social network data model.

In a still further possible embodiment of the message distribution apparatus, the mapping engine is adapted to derive a group of potential receiving users for the submitted message from the expanded group of identified users.

In a further possible embodiment of the message distribution apparatus, the distribution engine comprises a distribution filter adapted to filter the group of potential receiving users output by the mapping engine depending on a priority indicator of the submitted message and/or the personal settings of the potential receiving users.

In a possible embodiment the priority indicator indicates a level of importance of the submitted message.

In a still further possible embodiment of the message distribution apparatus, the distribution engine comprises a distribution filter adapted to filter the group of potential receiving users output by the mapping engine depending on a predetermined maximum number of receiving users.

In a still further possible embodiment of the message distribution apparatus, the priority indicator can be assigned by the submitting user to the submitted message.

In an alternative embodiment the priority indicator can be calculated on the basis of adjustable importance criteria comprising a business impact, an urgency and a topic novelty of the submitted message.

In a still further possible embodiment of the message distribution apparatus, the distribution engine is adapted to derive the group of receiving users from the submitted message from the filtered sorted list of associated terms provided by the distribution filter.

In a possible embodiment of the message distribution apparatus, the apparatus is connected to a wired communication network.

In an alternative embodiment the communication network comprises a wireless network.

In a further possible embodiment the communication network to which the message distribution apparatus is connected can comprise a local area network, a wide area network, the internet or a telephone network.

In a further possible embodiment of the message distribution apparatus, the message distribution apparatus is provided for distribution of a message submitted by a user by means of a terminal connected to a communication network.

The message distribution apparatus receives a message to be distributed from a terminal which can comprise a telephone, a mobile terminal or a not mobile terminal comprising a computer, a laptop, a PDA, a mobile station or a mobile phone of a user.

In a still further possible embodiment of the message distribution apparatus, the message distribution apparatus is provided for distributing a submitted message which can comprise an electronic message, in particular an e-mail, an sms, a RSS-feed, a voice message or at least one data packet.

In a still further possible embodiment of the message distribution apparatus, the employed semantic network data model can comprise at least one semantic network data model layer including
an imported semantic network layer,
an edited semantic network layer,
a semantic network layer of co-occurrence relations and
an aggregated semantic data model layer aggregated on the basis of other semantic network layers.

In a further possible embodiment of the message distribution apparatus, the employed social network data model can comprise at least one social network data model layer including
a social network layer of explicit relations between users,
a social network layer derived from interactions between users,
a social network layer of potential relations between users and
an aggregated social network layer aggregated on the basis of other social network layers.

According to further embodiments, a method for distributing a message submitted by a user by means of a terminal connected to a communication network to a previously unknown group of receiving users may comprise the steps of:
providing a semantic network data model comprising terms linked to each other by semantic relations and/or a social network data model comprising users linked to each other by social relations;
mapping at least one term associated with the submitted message to terms being associated with users of said social network data model and/or terms of said semantic network data model to generate at least one group of potential receiving users for said submitted message; and
distributing the submitted message via said communication network to a group of receiving users filtered from the at least one group of potential receiving users.

According to other embodiments, a message distribution software tool may comprise a program having a program code for executing a method for distributing a message submitted by a user by means of a terminal connected to a communication network to a previously unknown group of receiving users comprising the steps of:
providing a semantic network data model comprising terms linked to each other by semantic relations and/or a social network data model comprising users linked to each other by social relations;
mapping the at least one term associated with the submitted message to terms being associated with users of said social network data model and/or terms of said semantic network data model to generate at least one group of potential receiving users for said submitted message; and
distributing the submitted message via said communication network to a group of receiving users filtered from the at least one group of potential receiving users.

According to yet further embodiments, a data carrier may store such a message distribution software tool.

According to yet further embodiments, a communication network may comprise at least one message distribution apparatus for distributing of a message submitted by a user by means of a terminal connected to a communication network to a previously unknown group of receiving users; said message distribution apparatus comprising:
an access to a database which stores a semantic network data model comprising terms linked to each other by semantic relations and/or a social network data model comprising users linked to each other by social relations;
a mapping engine which is adapted to map at least one term being associated with the submitted message to terms being associated with users of said social network data model and/or with terms of said semantic data model for generating at least one group of potential receiving users for said submitted message; and
a distribution engine which is adapted to distribute the submitted message of said submitting user via said communication network to a group of receiving users filtered from the at least one generated group of potential receiving users;
wherein said communication network further comprises a plurality of user terminals connected to said communication network.

According to yet further embodiments, a server of a communication network may comprise an execution unit for executing an application using a message distribution software tool which comprises a program having a program code for executing a method for a distributing message submitted by a user by means of a terminal connected to a communication network to a previously unknown group of receiving users comprising the steps of:
providing a semantic network data model comprising terms linked to each other by semantic relations and/or a social network data model comprising users linked to each other by social relations;
mapping at least one term associated with the submitted message to terms being associated with users of said social network data model and/or terms of said semantic network data model to generate at least one group of potential receiving users for said submitted message; and
distributing the submitted message via said communication network to a group of receiving users filtered from the at least one group of potential receiving users;
wherein said application comprises a browser from a social networking application, an expert application or an information distribution application.

As can be seen from FIG. 1 a communication system 1 comprises at least one message distribution apparatus 2 according to various embodiments provided for distribution of an electronic message submitted by a user 5-*i* by means of a terminal 4-*i* connected to a communication network 3.

As can be seen in FIG. 1 the communication network 3 is connected to a data interface 2A of the message distribution apparatus 2. The message distribution apparatus 2 is provided for distributing an electronic message submitted by a user 5-$i$ by means of a terminal 4-$i$ as illustrated in FIG. 1. Each terminal 4 can comprise a user interface for a corresponding user 5 as illustrated in FIG. 1. Users 5-$i$ can be as shown in FIG. 1 natural persons exchanging messages via the communication network 3. Users can also be higher layer applications using the message distribution system 1 for exchanging information. The users 5-$i$ can also be application programs working on higher layers and employing a message distribution software tool for exchanging data and information with each other via the communication network 3. The communication network 3 as shown in FIG. 1 can be any kind of network, in particular a wired or wireless network. The communication network 3 can comprise a data network including a local area network LAN, a wide area network WAN, the internet but also a telephone network. The communication network 3 is adapted to transport electronic messages including e-mails, sms messages, RSS-feeds, voice messages or any kind of data packet streams. The message distribution apparatus 2 comprises in the shown embodiment a mapping engine 2B and a distribution engine 2C. In a possible embodiment the message distribution apparatus 2 has access to a database 6. In the embodiment shown in FIG. 1 the database 6 is a local database which is connected to the mapping engine 2B via an interface. In an alternative embodiment the database 6 can also be connected to the communication network 3 and the message distribution apparatus 2 has access to the database via its network interface 2A and the communication network 3. The database 6 can also be formed by a database of a server connected to the communication network 3. The database 6 stores a semantic network data model SEM-DM and/or a social network data model SOC-DM. The semantic network data model SEM-DM comprises terms linked to each other by semantic relations. The social network data model SOC-DM comprises users linked to each other by social relations. The database 6 can even store more than one semantic network data model SEM-DM and more than one social network data model SOC-DM.

The message distribution apparatus 2 is provided for distributing a message M submitted by one of the users 5-$i$ by means of a terminal 4-$i$ connected to the communication network 3 to a previously unknown group of receiving users 5.

The mapping engine 2B is adapted to map at least one term being associated with the submitted message M to terms being associated with users of said social network data model SOC-DM and/or with terms of the semantic data model SEM-DM for generating at least one group of potential receiving users for said submitted message M.

The distribution engine 2C of the message distribution apparatus 2 is adapted to distribute the submitted message of the submitting user via the communication network 3 to a group of receiving users filtered from at least one generated group of potential receiving users.

If a user runs an application program which submits an electronic message M such as an e-mail, an sms, a RSS-feed or a voice message or one or several data packets at a terminal 4 to the communication network 3 the submitted message M is forwarded by the communication network 3 to the message distribution apparatus 2 being connected to the communication network 3. The message distribution apparatus 2 can form part of a server connected to the communication network 3 or of a terminal 4 being part of the communication system 1 as shown in FIG. 1. In a possible implementation the address of the message distribution apparatus 2 forms configuration data. A message distribution software tool using the message distribution apparatus 2 as shown in FIG. 1 can also be pre-configured with the address of the message distribution apparatus 2 connected to the communication network 3. The submitted message M comprises at least one term associated with the submitted message. This tag or term can be assigned by the submitting user 5-$i$ to the submitted message M. In an alternative implementation the tag can also be derived automatically from the submitted message M, in particular from the content of the submitted message M.

In a possible embodiment the mapping engine 2B of the message distribution apparatus 2 is adapted to expand the at least one term associated with the submitted message M to related associated terms on the basis of weighted semantic relation links of the semantic network data model SEM-DM stored in the database 6. The mapping engine 2B can be adapted to calculate a sorted list of associated related terms being associated with the at least one term of the submitted message M, on the basis of the weighted semantic relation links of the semantic network data model SEM-DM to identify those users having a relation to the related associated terms. The mapping engine 2B can be further adapted to expand the identified users having a relation to the related associated terms by further users having a close social relationship with the identified users on the basis of the weighted social relation links of said social network data model SOC-DM being stored in the database 6. The mapping engine 2B is adapted to provide a group of potential receiving users for the submitted message M from the expanded group of identified users. The expanded group of identified users can be supplied by the mapping engine 2B to the distribution engine 2C. The distribution engine 2C is adapted to filter the received group of potential receiving users. In a possible embodiment the distribution engine 2C can comprise a distribution filter adapted to filter the received group of potential receiving users output by the mapping engine 2B. The distribution can be performed according to a priority indicator of the submitted message M. This priority indicator can indicate a level of importance of the submitted message M. In a possible embodiment this priority indicator can be assigned by the submitting user to the submitted message M. In an alternative implementation the priority indicator can also be calculated on the basis of importance criteria. These importance criteria can be, for example, a business impact, an urgency or a topic novelty of the submitted message M. In a further embodiment the importance criteria can be predetermined and a level of fulfillment can be adjusted by the respective user by a corresponding input to a user interface of the terminal 4. For example, a user might indicate that the submitted message M has a high business impact, is very urgent and includes important information. In this example the priority indicator of the submitted message M is calculated to be high. The priority indicator indicates a level of importance of the submitted message M. The filter of the distribution engine 2C can be adjusted in response to the priority indicator of the submitted message M. For a high priority indicator the filter of the distribution engine 2C does filter the group of potential receiving users only slightly, so that a high number of members in the group of users actually receives the submitted message M. In contrast, if the priority indicator of the submitted message is calculated to be low indicating a submitted message of low importance, the group of potential receiving users will be filtered by the filter of the distribution engine 2C more strictly so that the number of users actually receiving the submitted message M is comparatively low. Accordingly, the priority indicator can be calculated in a possible embodiment on the basis of adjusted importance criteria of the submitted message. In an alternative implementation the priority indicator of the submitted message can also be directly assigned by the submitting user 5-$i$ to the submitted message M. In a still further embodiment the filtering by the filter of the distribution engine 2C is not performed on the basis of a priority indicator but depending on a predetermined maximum number of receiving users. This maximum number of receiving users can be set by an administrator of the communication system 1 as shown in FIG. 1. In an alternative embodiment this possible maximum number of receiving users might also be set by the submitting user 5. In an alternative embodiment the filter considers the personal settings of the potential receiving users. For example if somebody wants to receive a certain maximal number of messages per time period he therefore sets his personal settings to this value. In a possible embodiment the distribution engine 2C of the message distribution apparatus 2 is adapted to distribute the submitted message M to any user of the filtered group of users by pushing that submitted message M to the terminal 4-$i$ of the respective user. In an alternative embodiment the distribution engine 2C is adapted to distribute the submitted message M to any users of the filtered group of receiving users by pushing the submitted message to a personalized webpage of the respective user. For example, the submitted message M can be pushed to a dashboard of the other user who pulls the message M from his dashboard.

In the embodiment shown in FIG. 1 the message distribution apparatus 2 is a separate apparatus connected to the communication network 3 and can form, for example, part of a server in a communication network 3. In a further possible embodiment the message distribution apparatus 2 can also form part of at least one terminal 4-$i$ within the communication network 3. In a still further possible implementation each terminal 4-$i$ of the communication system 1 can comprise a message distribution apparatus 2 as shown in FIG. 1 for exchanging messages with each other. The message distribution apparatus 2 can form part of a mobile or not mobile apparatus connected to the communication network 3. In a possible embodiment as shown in FIG. 1 the social and semantic network data model is stored in a database 6 to which the message distribution apparatus 2 has access. In a possible embodiment the semantic and social data model can be loaded from an external database. Further, it is possible that the social and semantic data model network is derived and calculated from existing data models. The semantic network data model and the social network data model can comprise one or several layers.

FIG. 3 shows an example of a semantic network data model SEM-DM having several layers including in the shown embodiment an imported semantic network layer L3 and an edited semantic network layer L2 and a semantic network layer L1 of co-occurrence relations. Further, the semantic network data model SEM-DM can comprise an aggregated semantic data model layer L4 being aggregated on the basis of the other semantic network layers. The semantic network data model SEM-DM comprises terms linked to each other by semantic relations. Each layer L of the semantic network data model SEM-DM comprises different kinds of semantic relations. For example, the imported semantic network layer L3 can comprise thesaurus relations such as "is related to", "is a synonym of", "is a narrower term" or "is a broader term". The imported semantic thesaurus relations of layer L3 as shown in FIG. 3 can, for example, be derived from DBPEDIA. The same types of semantic relations can also be used for example in a second network layer L2 comprising edited semantic thesaurus relations. In the given example of FIG. 3 the layer L1 is a layer of co-occurrence relations comprising weighted semantic links indicating a level of relevance between the terms. On the basis of layers L1, L2, L3 an aggregated semantic data model layer can be calculated as layer L4 shown in FIG. 3. This aggregated semantic data model layer L4 comprises also weighted semantic links. The semantic data model SEM-DM as shown in FIG. 3 can be stored in a database 6 to which the message distribution apparatus 2 has access to as illustrated for example in FIG. 1.

The database 6 can further comprise a social network data model SOC-DM having several network data model layers L as illustrated in FIG. 4. In the shown example the social network data model SOC-DM comprises also four layers L1 to L4. The social network data model layers comprise an aggregated social network layer L4, a social network layer L3 of explicit relations between users, a social network layer L2 derived from interactions between users and a social network layer L1 of potential relations between users. The aggregated social network layer L4 can be aggregated on the basis of the other social network layers L1, L2, L3. The social network layer L3 of explicit relations between users 3 can comprise the relations such as "follows"; "is friend of" etc. There can be a social network layer L2 derived from interactions between users such as "is co-author of"; "comments on" etc. Further, there can be a social network layer L1 of potential relations between users that might be derived from similarities between the individual tag cloud of the respective users or similarities in their community memberships. In the shown example of FIG. 4 the social network layer L1 of potential relations comprises metrics for social links between the users.

FIG. 2 shows a flow chart of a possible embodiment as a method for distributing a message M submitted by a user 5 by means of a terminal 4 connected with communication network 3 to a previously unknown group of receiving users.

In a first step S1 a semantic network data model SEM-DM as shown in FIG. 3 comprising terms linked to each other by semantic relations and/or a social network data model SOC-DM such as shown in FIG. 4 comprising users linked to each other by social relations is provided. The semantic network data model SEM-DM and the social network data model SOC-DM can comprise several layers L and can be stored in a database such as database 6 shown in FIG. 1.

In a further step S2 at least one term associated with the submitted message M is mapped to terms being associated with users of the social network data model SOC-DM and/or terms of the semantic network data model SEM-DM to generate at least one group of potential receiving users for the submitted message M. The mapping step can be performed, for example, by a mapping engine 2B as shown in FIG. 1.

In a further step S3 the submitted message M is distributed via the communication network 3 to a group of receiving users filtered from the at least one group of potential receiving users. This distribution of the submitted message M can be performed in a possible embodiment by a distribution engine 2C as shown in FIG. 1.

The message distribution apparatus 2 can generate all kinds of lists of receiving users 5 on the basis of the semantic and social data model according to the requirements of the users. For example, the distribution apparatus 2 can filter users who have used a tag of the submitted message M themselves. This can be restricted depending on how often the respective user has used the respective tag. For example, if a user 5 only gets the submitted message M when he has used the same tag at least three times within the last 24 months in one of his submitted messages M. A further possible list of receiving users can be calculated by the message distribution apparatus 2 for users which follow a tag of the submitted message M.

A further possible list of users can be users which form part of a personal social network which is characterized by a tag of the submitted message M. As a possible restriction only a moderator of the respective group is addressed. For example, only those members are considered who have participated in a period of, for example, the last 12 months.

A further list of receiving users 5 can include persons or users which belong to a partner social network of the social data network model SOC-DM that are characterized by one tag of the submitted message. In a possible restriction only the moderator of the respective group is addressed. A further possible list of users comprises persons which follow the author of the submitted message M. A further possible list of receiving users can comprise users which have interacted with the author of the submitted message.

With the method and apparatus according to various embodiments the group of users actually receiving the submitted message M is dynamically generated by evaluating a semantic and social data network model comprising in a possible embodiment several layers L. The submitting user can influence the size of the group receiving the submitted message M by using a priority indicator or by giving criteria for calculating such a priority indicator. The submitted message M is delivered only to those users which are really relevant for the submitted message M and which can have an interest in its content. The submitting user wishing to distribute a message M does not administrate a list of receiving users but can make use of a database including a social and/or semantic network data model. In a further embodiment the semantic data model SEM-DM and the social data model SOC-DM can be provided by different data model suppliers. In a still further possible embodiment a semantic or social data model can be derived from existing data models. For example, a social data network model SOC-DM used by the message distribution apparatus 2 according to various embodiments can be derived from an existing social data network model such as Facebook, LinkedIn or Xing. A further possible social data network SOC-DM layer used by the message distribution apparatus 2 according to various embodiments can be a social network data model of a company indicating relation links between the employees or users. In a further possible embodiment the user can influence what kind of semantic or social data network layers L are used by the mapping engine 2B. For instance, if the user 5 classifies the submitted message M as private another social network data model layers can be used than in a case where the user classifies the submitted message M as a business message or inquiry. In a further possible implementation the used semantic or social data model layers L can be edited by the respective user 5. For example, a social network data model layer can be displayed to a user and can be edited by the user for optimizing the distribution of his submitted messages M. With the method and apparatus for distributing messages the number of users actually receiving the submitted message M can vary and depend on the content of the submitted message as well as from other factors such as the priority indicator or the like. In a further possible implementation the submitting user receives a feedback indicating the number of actual receiving users. In a further possible implementation the submitting user also receives a list of all users which have actually received the submitted message M from the message distribution apparatus 2. In a further embodiment the user has the possibility to actually verify whether a specific user has got the submitted message M. The message distribution apparatus 2 and method according to various embodiments can be used for any kind of submitted message M. For example, it can be used for urgent requests or inquiries submitted by a user of the communication system 1. Further, it can be used for distributing a newsletter to an unspecified group of previously unknown receiving users. Only the most relevant interested users receive the newsletter distributed by the message distribution apparatus 2 according to various embodiments.

The messages M can also include messages input by a user in a telephone terminal. In a possible embodiment the mapping engine 2B is adapted to expand the at least one term associated with the submitted message M to related associated terms. The mapping engine 2B can be adapted to expand the identified users having a relation to the related associated terms by users having a close social relationship with the identified users. In a possible embodiment the extent of expansion can be controlled by adjusting threshold values. In a possible embodiment a radius around the respective term or user within the semantic or social network data model or layer can be configured or adjusted by a user or an administrator of the communication system 1.

The message apparatus 2 for distributing messages or information in general can be used in a wide range of applications. Such applications can comprise browser applications, social network applications, expert applications as well as information distribution applications. The method for distributing submitted messages M can for example be used as a tool for social network applications such as Facebook or Xing. It can be used for distributing and browser applications. In a further possible embodiment of the message distribution apparatus 2 the submitting user can be informed of the number of filtered users actually receiving the submitted message M before performing the distribution of the submitted messages M. This is an important feature for all applications where the distribution of the messages M involves costs for the submitting user. If the number of actual receiving users is deemed to be too high for the submitting user he can still restrict the number of receiving users, for example by changing the priority indicator or by expressively giving a limit to the maximum number of receiving users. In this embodiment the message distribution apparatus 2 as shown in FIG. 1 sends an indication message to the terminal 4-*i* of the submitting user 5-*i* indicating the calculated number of receiving users to which the submitted message M will be distributed. The message distribution apparatus 2 waits for a confirmation of the user 5-*i* forming a triggering signal to distribute the submitted message M to the filtered group of users. In a further possible implementation the message distribution apparatus 2 can adapt the social data model layers depending on the response of the users having received the submitted message from the message distribution apparatus 2. For example, if the receiving users acknowledge that the received submitted message M has been interesting for them, at least social data network layer employed by the message distribution apparatus 2 can be updated accordingly. In an embodiment the data model layers stored in the database 6 are not static but can be adapted dynamically, for example on the basis of the responses of users having received the submitted message M.

What is claimed is:

1. A message distribution apparatus for distribution of a message submitted by a submitting user by means of a terminal connected to a communication network to a previously unknown group of receiving users;
   said message distribution apparatus including a computer coupled to the communication network and comprising:
   (a) a database which stores a semantic network data model comprising terms linked to each other by at least one of semantic relations and a social network data model comprising users linked to each other by social relations, wherein said semantic network data model comprises:
   an imported semantic network data model layer,
   an edited semantic network data model layer,
   a semantic network data model layer of co-occurrence relations, and
   an aggregated semantic data model layer aggregated on the basis of other semantic network layers;
   (b) a mapping engine that receives the message submitted by said submitting user and maps at least one term being associated with the submitted message to at least one of terms being associated with users of said social network data model and terms of said semantic data model for generating at least one group of potential receiving users for said submitted message prior to delivery of the submitted message; and
   (c) a distribution engine that delivers the submitted message of said submitting user via said communication network to a group of receiving users automatically filtered from the at least one group of potential receiving users generated by said mapping engine,
   such that the group of receiving users to which the submitted message is delivered is automatically determined by the mapping engine and distribution engine after submission of the submitted message and prior to delivery of the submitted message.

2. The message distribution apparatus according to claim 1, wherein said submitted message comprises as the at least one term associated with said submitted message a tag assigned by said submitting user to said submitted message or a tag derived from said submitted message.

3. The message distribution apparatus according to claim 1, wherein said mapping engine is adapted to expand the at least one term associated with said submitted message to related associated terms on the basis of weighted semantic relation links of said semantic network data model.

4. The message distribution apparatus according to claim 1, wherein the distribution engine is adapted to distribute the submitted message to another user by pushing said submitted message to the terminal of the other user or to a personalized webpage of the other user.

5. The message distribution apparatus according to claim 3, wherein the mapping engine is adapted to calculate a sorted list of associated related terms being associated with the at least one term of the submitted message on the basis of weighted semantic relation links of said semantic network data model to identify users having a relation to the related associated terms.

6. The message distribution apparatus according to claim 5, wherein said mapping engine is adapted to expand the identified users having a relation to the related associated terms by users having a close social relationship with the identified users on the basis of the weighted social relation links of said social network data model.

7. The message distribution apparatus according to claim 6, wherein said mapping engine is adapted to derive a group of potential receiving users for the submitted message from the expanded group of identified users.

8. The message distribution apparatus according to claim 7, wherein the distribution engine comprises a distribution filter adapted to filter the group of potential receiving users output by said mapping engine depending on a priority indicator of the submitted message, wherein
   said priority indicator indicates a level of importance of the submitted message or depending on a predetermined maximum number of receiving users, and/or depending on the personal settings of the potential receiving users.

9. The message distribution apparatus according to claim 8, wherein said priority indicator is assigned by the submitting user to the submitted message or calculated on the basis of importance criteria comprising a business impact, an urgency and a topic novelty of the submitted message.

10. The message distribution apparatus according to claim 1, wherein said communication network comprises a wired or wireless data network including a local area network, a wide area network or the internet or a telephone network.

11. The message distribution apparatus according to claim 1, wherein said terminal is a telephone, a mobile terminal or a not mobile terminal comprising a computer, a laptop, a PDA, a mobile station or a mobile phone of a user.

12. The message distribution apparatus according to claim 1, wherein said submitted message is an electronic message comprising an e-mail, an SMS, a RSS-feed, a voice message or a data packet.

13. A communication network comprising at least one message distribution apparatus according to claim 1 and a plurality of user terminals.

14. The message distribution apparatus according to claim 1, wherein said social network data model comprises:
   a social network data model layer of explicit relations between users,
   a social network data model layer derived from interactions between users,
   a social network data model layer of potential relations between users, and
   an aggregated social network data model layer aggregated on the basis of other social network layers.

15. A method for distributing a message submitted by a submitting user via a terminal connected to a communication network to a previously unknown group of receiving users, the method comprising:
   (a) at a computer communicatively coupled to the network, providing a semantic network data model comprising terms linked to each other by at least one of semantic relations and a social network data model comprising users linked to each other by social relations, wherein said semantic network data model comprises:
   an imported semantic network data model layer,
   an edited semantic network data model layer,
   a semantic network data model layer of co-occurrence relations, and
   an aggregated semantic data model layer aggregated on the basis of other semantic network layers;
   (b) at the computer, receiving the message submitted by said submitting user and mapping at least one term associated with the submitted message to at least one of terms being associated with users of said social network data model and terms of said semantic network data model to generate at least one group of potential receiving users for said submitted message prior to delivery of the submitted message; and (c) delivering the submitted message via said communication network to a group of receiving users automatically filtered from the at least one group of potential receiving users generated by a mapping engine, such that the group of receiving users to which the submitted message is delivered is automatically determined by the mapping engine and distribution engine after submission of the submitted message and prior to delivery of the submitted message.

16. A server of a communication network comprising a non-transitory execution unit for executing an application using said method of claim 15, said application comprising a browser, a social networking application, an expert application or an information distribution application.

17. The method for distributing a message according to claim 15, wherein said social network data model comprises at least one social network data model layer including:

a social network layer of explicit relations between users, a social network layer derived from interactions between users, a social network layer of potential relations between users and an aggregated social network layer aggregated on the basis of other social network layers.

18. The method according to claim 15, wherein said submitted message comprises as the at least one term associated with said submitted message a tag assigned by said submitting user to said submitted message or a tag derived from said submitted message.

19. A non-transitory memory device storing instructions which when executed on a computer perform a method for distributing a message submitted by a submitting user by a terminal connected to a communication network to a previously unknown group of receiving users comprising:

providing a semantic network data model comprising terms linked to each other by at least one of semantic relations and a social network data model comprising users linked to each other by social relations, wherein said semantic network data model comprises:

an imported semantic network data model layer, an edited semantic network data model layer, a semantic network data model layer of co-occurrence relations, and an aggregated semantic data model layer aggregated on the basis of other semantic network layers;

receiving the message submitted by said submitting user;

mapping at least one term associated with the submitted message to at least one of terms being associated with users of said social network data model and terms of said semantic network data model to generate at least one group of potential receiving users for said submitted message prior to delivery of the submitted message; and delivering the submitted message via said communication network to a group of receiving users automatically filtered from the at least one group of potential receiving users generated by said mapping, such that the group of receiving users to which the submitted message is delivered is automatically determined by the mapping engine and distribution engine after submission of the submitted message and prior to delivery of the submitted message.

20. The non-transitory memory device storing instructions according to claim 19, wherein said social network data model comprises at least one social network data model layer including:

a social network layer of explicit relations between users, a social network layer derived from interactions between users, a social network layer of potential relations between users and an aggregated social network layer aggregated on the basis of other social network layers.

* * * * *